(12) United States Patent
Maruyama et al.

(10) Patent No.: US 10,529,122 B2
(45) Date of Patent: Jan. 7, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Kazuna Maruyama, Fuchu (JP); Yasushi Shikata, Tama (JP); Norihisa Suzuki, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/025,758

(22) Filed: Jul. 2, 2018

(65) Prior Publication Data

US 2019/0012825 A1 Jan. 10, 2019

(30) Foreign Application Priority Data

Jul. 4, 2017 (JP) .................................. 2017-131454

(51) Int. Cl.
*G06T 15/20* (2011.01)
*H04N 5/232* (2006.01)

(52) U.S. Cl.
CPC .......... *G06T 15/20* (2013.01); *H04N 5/23296* (2013.01)

(58) Field of Classification Search
None
See application file for complete search history.

(56) References Cited

U.S. PATENT DOCUMENTS

| | | | | |
|---|---|---|---|---|
| 6,728,477 B1* | 4/2004 | Watkins | ............... | G11B 27/105 348/E5.053 |
| 10,105,601 B1* | 10/2018 | Hariton | ................... | A63F 13/53 |
| 2006/0090183 A1* | 4/2006 | Zito | ................... | G06F 16/24578 725/46 |
| 2011/0083086 A1* | 4/2011 | Brownlow | .......... | G06F 3/04815 715/753 |
| 2016/0250553 A1* | 9/2016 | Ikenaga | .................. | A63F 13/86 463/31 |
| 2017/0316639 A1* | 11/2017 | Lyons | ................. | G07F 17/3211 |
| 2017/0359624 A1* | 12/2017 | Englert | ............... | G06F 3/04815 |
| 2019/0268587 A1* | 8/2019 | Sato | ..................... | H04N 13/351 |

FOREIGN PATENT DOCUMENTS

| | | |
|---|---|---|
| JP | 2007195091 A | 8/2007 |
| JP | 2012109719 A | 6/2012 |

* cited by examiner

*Primary Examiner* — Fernando Alcon
(74) *Attorney, Agent, or Firm* — Canon U.S.A., Inc. IP Division

(57) ABSTRACT

An information processing apparatus includes a receiving unit configured to receive a type of event in a imaging target region, and a restriction unit configured to restrict generation of a virtual viewpoint image, by referring to a restriction content related to generation of a virtual viewpoint image and determined for an imaging target region, and a restriction content related to generation of a virtual viewpoint image and determined for a type of event of an imaging target.

14 Claims, 19 Drawing Sheets

FIG.4A
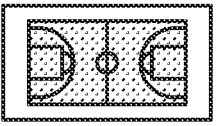
FIG.4B
EVENT TYPE = CONCERT
NO LAYOUT
SPECIFIC TO EVENT
| STAGE | n.a. |
|---|---|
| SEATS | 10 m |
FIG.4C

A STADIUM
×
BASKETBALL

☐ PROXIMITY DISTANCE_2 m
▦ PROXIMITY DISTANCE_10 m
▨ PROXIMITY DISTANCE_10 m (0 - 180 deg)
▧ PROXIMITY DISTANCE_10 m (180 - 360 deg)

330 deg ⇒ 2 m   30 deg ⇒ 10 m
C2

A STADIUM
×
CONCERT

A STADIUM
×
VOLLEYBALL

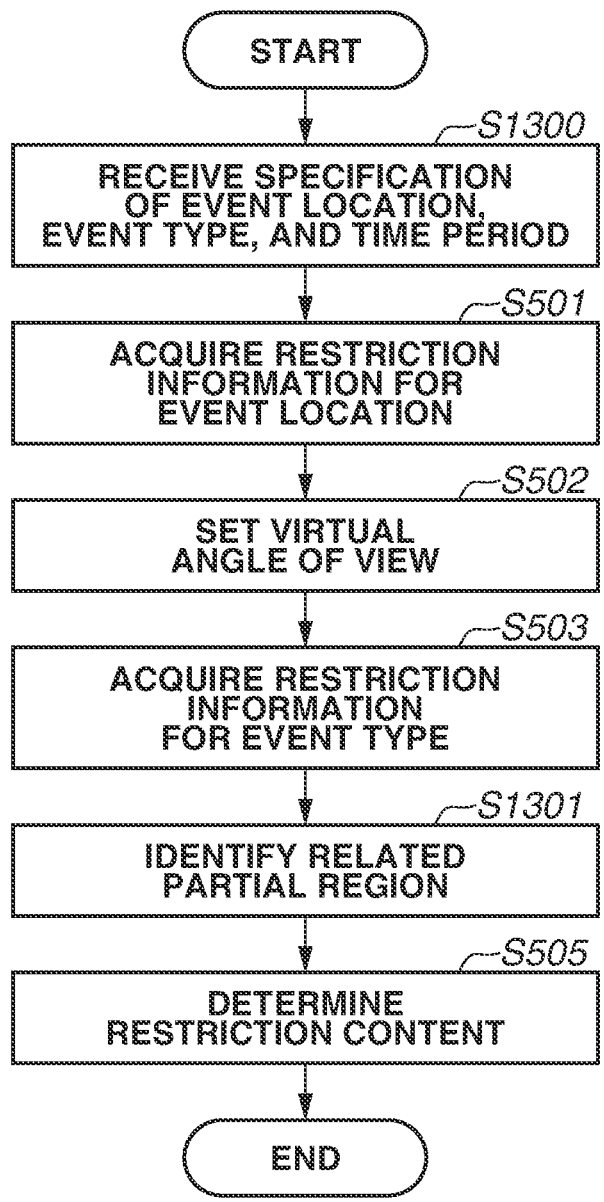

A STADIUM
×
BASKETBALL
@
HALFTIME

☐ PROXIMITY DISTANCE_2 m

▨ PROXIMITY DISTANCE_5 m

▦ PROXIMITY DISTANCE_10 m

A STADIUM
×
BASKETBALL
@
SET 2

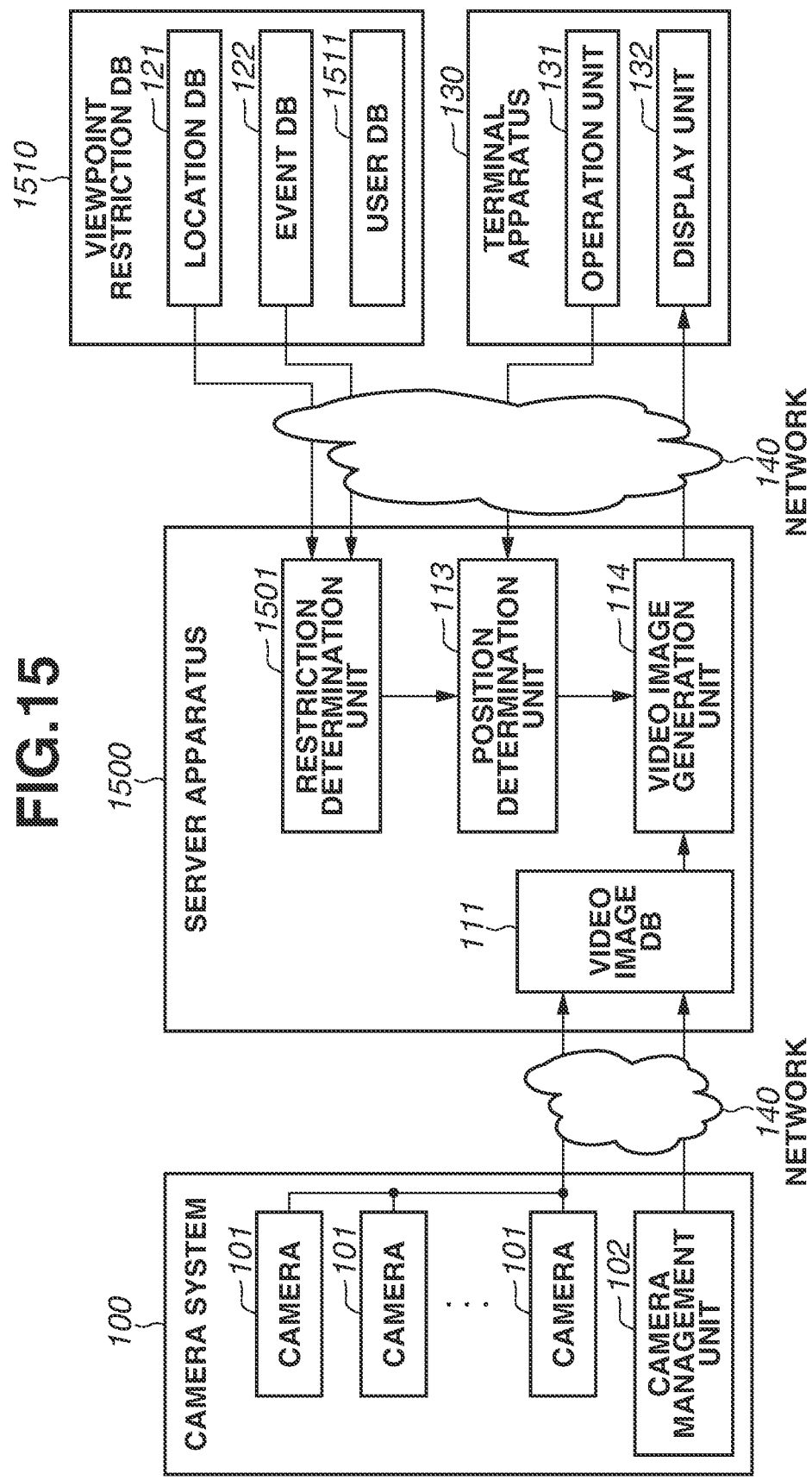

FIG.16

| USER CLASSIFICATION | CHANGE CONTENT |
|---|---|
| GUARD | RESTRICTION_NONE |
| SPECTATOR_INSIDE OF VENUE | RESTRICTION_NORMAL |
| SPECTATOR_OUTSIDE OF VENUE | RESTRICTION_5 m+ |

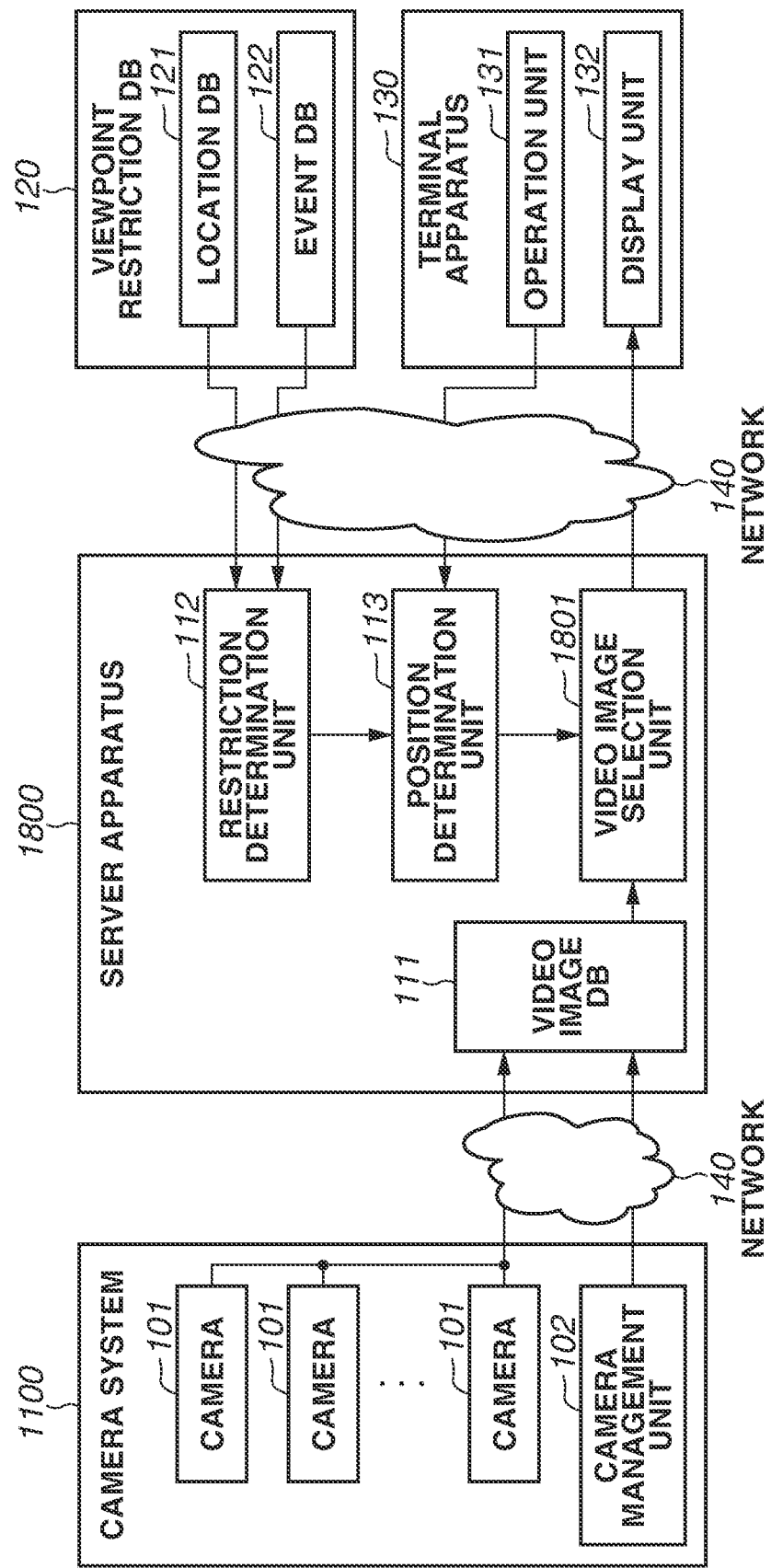

INFORMATION PROCESSING APPARATUS, INFORMATION PROCESSING METHOD, AND STORAGE MEDIUM

BACKGROUND

Field of the Disclosure

The present disclosure relates to an information processing apparatus and an information processing method that restrict generation of a virtual viewpoint image, and to a storage medium that stores a program for implementing the restriction method.

Description of the Related Art

In recent years, a service for generating a virtual viewpoint image from a multiple-viewpoint video image and providing the generated virtual viewpoint image to a person such as a spectator has been started. In this service, high-definition cameras are disposed to surround a playing field, and image the playing field, thereby obtaining the multiple-viewpoint video image. The virtual viewpoint image appears to have been captured from a camera position that does not exist in real. Using a camera that supports high resolution such as 4K or 8K, a user can view a highly realistic image from a desired viewpoint, such as a viewpoint so close to a player that a facial expression of the player is clearly visible.

In a virtual viewpoint image obtained by using a high-definition camera, spectators unrelated to a play can be displayed in a state where individuals can be identified, or a manager or a player can be displayed in a state where a coded sign is clearly visible. Therefore, it is desirable to restrict the position or direction of a virtual viewpoint in some cases. Japanese Patent Application Laid-Open No. 2007-195091 discusses a related technology. This technology can set a region prohibiting/allowing the movement of a viewpoint, and a prohibited/allowed direction of a line of sight. Japanese Patent Application Laid-Open No. 2012-109719 discusses another related technology. The technology controls a viewpoint movement level in reproducing an arbitrary viewpoint video image, for each of areas such as a product display area and a commentator area.

However, a sports venue called a stadium or an arena is used for various competitions such as a martial art, basketball, volleyball, soccer, and a track and field event, and playing fields vary among the competitions. In addition, such a sports venue is also used as a concert venue, and an area used as a playing field in a sporting event is used for seats in a concert. In this way, use purposes vary among the events even if the events are each held in the same location. Therefore, in a case where a virtual viewpoint is restricted depending on the venue, a virtual viewpoint image suitable for an event is not always provided, which is a problem.

SUMMARY

According to an aspect of the present disclosure, an information processing apparatus restricts generation of a virtual viewpoint image based on a plurality of images obtained by a plurality of cameras that images an imaging target region from different directions, and the information processing apparatus includes an acquisition unit configured to acquire event information about a type of event in the imaging target region, and a restriction unit configured to restrict generation of a virtual viewpoint image, based on the event information acquired by the acquisition unit.

Further features of the present disclosure will become apparent from the following description of exemplary embodiments with reference to the attached drawings.

BRIEF DESCRIPTION OF THE DRAWINGS

FIGS. 4A, 4B, and 4C are diagrams each illustrating an example of restriction information for each event type.

FIG. 13 is a flowchart illustrating restriction determination processing.

FIG. 15 is an overall diagram of a system according to a third exemplary embodiment.

FIG. 16 is a diagram illustrating an example of a user database (DB).

FIG. 18 is an overall diagram of a system according to a fourth exemplary embodiment.

DESCRIPTION OF THE EMBODIMENTS

Exemplary embodiments of the present disclosure will be described below with reference to the drawings.

Figure 1:
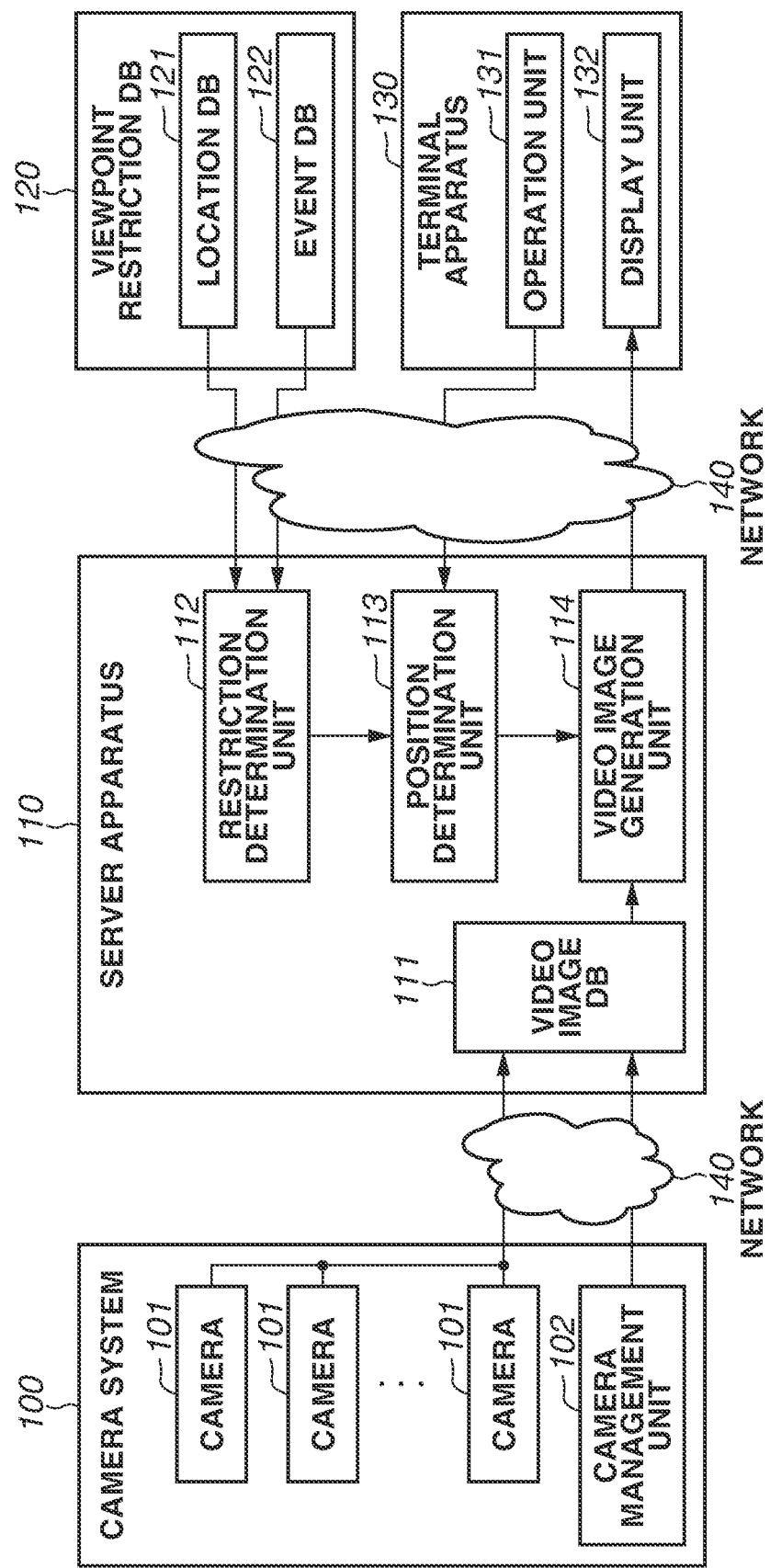
FIG. 1 is an overall diagram of a system.

FIG. 1 is an overall diagram of a system. A system according to a first exemplary embodiment is an example of an information processing system. The system has a camera system 100, a server apparatus 110, a viewpoint restriction database (DB) 120, and a terminal apparatus 130. The server apparatus 110 is an example of an information processing apparatus. The camera system 100 has a plurality of cameras 101 and a camera management unit 102. The cameras 101 are disposed to surround a playing field where an object can be present, for example, in an imaging target region (an imaging location) such as a sports venue. The cameras 101 capture video images of a playing field from a plurality of viewpoints and directions, and transmit the captured video images to the server apparatus 110 via a network 140. The camera management unit 102 manages intrinsic parameters such as a focal length of each of the cameras 101, and extrinsic parameters such as a relative position between the cameras 101, as camera parameters. The camera management unit 102 transmits the camera parameters to the server apparatus 110 via the network 140.

The server apparatus 110 has a video image DB 111, a restriction determination unit 112, a position determination unit 113, and a video image generation unit 114. The video image DB 111 stores multiple-viewpoint video data received from the cameras 101 via the network 140, and camera parameters received from the camera management unit 102 via the network 140. The video image DB 111 transmits the camera parameters and the video data to the video image generation unit 114, in response to a request from the video image generation unit 114.

The restriction determination unit 112 acquires restriction information determined for an imaging target region, i.e., an event location, specified by a user in an apparatus such as the terminal apparatus 130, from a location DB 121 via the network 140. The restriction determination unit 112 also acquires restriction information determined for an event type specified by the user in the terminal apparatus 130, from an event DB 122 via the network 140. The restriction determination unit 112 determines a restriction content about setting of a virtual viewpoint, based on the acquired restriction information. Here, the restriction information indicates a restriction content related to generation of a virtual viewpoint image. The restriction information will be described in detail below.

The position determination unit 113 receives a position and a direction of a virtual viewpoint, from the terminal apparatus 130 via the network 140. Referring to the restriction information, the position determination unit 113 determines the final position of the virtual viewpoint, based on the position of the virtual viewpoint received from the terminal apparatus 130. The position of the virtual viewpoint received from the terminal apparatus 130 may be hereinafter referred to as a provisional position, and the position of the virtual viewpoint determined by the position determination unit 113 may be hereinafter referred to as an actual position.

The video image generation unit 114 acquires a position and a direction of a virtual viewpoint from the position determination unit 113. Further, from the video image DB 111, the video image generation unit 114 acquires camera parameters, and video data based on the position and the direction of a viewpoint necessary for generation of a virtual viewpoint image. Based on the position and the direction of the virtual viewpoint, as well as the camera parameters and the video data, the video image generation unit 114 synthesizes the virtual viewpoint image. The video image generation unit 114 transmits the obtained virtual viewpoint image to the terminal apparatus 130 via the network 140.

The viewpoint restriction DB 120 has the location DB 121 and the event DB 122. The location DB 121 stores pieces of restriction information determined for each event location, among the restriction information to be referred to by the server apparatus 110 in setting a virtual viewpoint. The location DB 121 stores pieces of restriction information corresponding to the respective locations. Specifically, the location DB 121 stores, for example, a piece of restriction information for a location A, and a piece of restriction information for a location B.

The event DB 122 stores pieces of restriction information determined for each event type, among the restriction information to be referred to by the server apparatus 110 in setting a virtual viewpoint. The event DB 122 holds pieces of restriction information corresponding to the respective types of event. Specifically, the event DB 122 holds, for example, a piece of restriction information for an event type X, and a piece of restriction information for an event type Y. Each piece of restriction information will be described in detail below.

The terminal apparatus 130 has an operation unit 131 for specifying information such as the position of a virtual viewpoint. The user can specify the position of a desired virtual viewpoint, by using the terminal apparatus 130. Further, the terminal apparatus 130 receives a virtual viewpoint image generated by the server apparatus 110, and displays the received virtual viewpoint image at a display unit 132.

In the present exemplary embodiment, the words "image" or "video image" is described to include a still image and a moving image unless otherwise specified. In other words, the server apparatus 110 may generate a moving image based on a virtual viewpoint and may generate a still image based on a virtual viewpoint. The camera 101 may capture a moving image and may capture a still image.

The function of each of the apparatuses in the system according to the present exemplary embodiment is not limited to the exemplary embodiment, and may be implemented by any of the apparatuses of the system. For example, the position determination unit 113 and the video image generation unit 114 may be included in the terminal apparatus 130, in place of the server apparatus 110. Further, in another example, the viewpoint restriction DB 120 may be provided integrally with the server apparatus 110.

Figure 2:
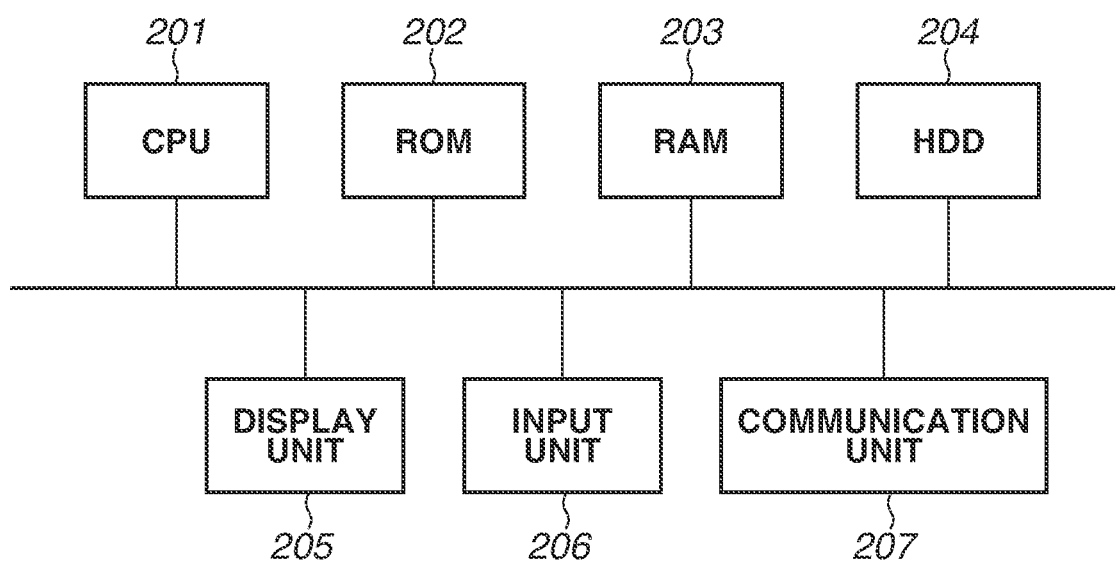
FIG. 2 is a hardware configuration diagram of a server apparatus.

FIG. 2 is a hardware configuration diagram of the server apparatus 110. The server apparatus 110 has a central processing unit (CPU) 201, a read only memory (ROM) 202, a random access memory (RAM) 203, a hard disk drive (HDD) 204, a display unit 205, an input unit 206, and a communication unit 207. The CPU 201 executes various kinds of processing by reading out a control program stored in the ROM 202. The RAM 203 is used as a temporary storage area such as a main memory or a working area of the CPU 201. The HDD 204 stores various kinds of data and various programs. The display unit 205 displays various kinds of information. The input unit 206 has a keyboard and a mouse, and receives various operations to be performed by the user. The communication unit 207 performs communication processing with an external apparatus via a network.

The CPU 201 reads out a program stored in the ROM 202 or the HDD 204 and executes the read-out program, thereby implementing the functions of the server apparatus 110 described with reference to FIG. 1, and processing to be described below of the server apparatus 110. In another example, the server apparatus 110 may read out a program stored in a recording medium such as a Secure Digital (SD) card, in place of the storage medium such as the ROM 202.

In another example, at least a part of the function and the processing of the server apparatus 110 may be implemented by allowing, for example, CPUs, RAMS, ROMs, and storages to cooperate with each other. In still another example, at least a part of the function and the processing of the server apparatus 110 may be implemented by using, for example, a hardware circuit such as an application-specific integrated circuit (ASIC) or a field-programmable gate array (FPGA).

Figure 3:
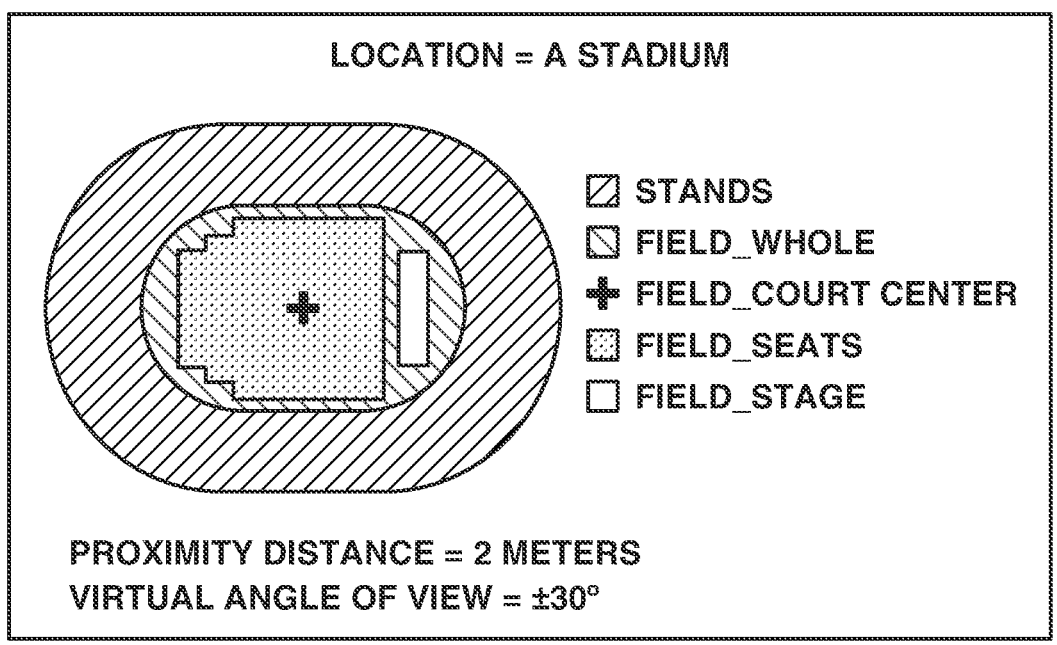
FIG. 3 is a diagram illustrating an example of restriction information for an event location.

Next, the restriction information stored in the viewpoint restriction DB 120 will be described. FIG. 3 is a diagram illustrating an example of the restriction information stored in the location DB 121. The location DB 121 stores the restriction information for each of different locations. The restriction information for each of the locations includes identification information indicating a location (an image-capturing region) and a restriction content at the location. FIG. 3 schematically illustrates an example of restriction information for a location of "A stadium". In the example in FIG. 3, "A stadium" is included as the identification information for location. The identification information for location is not limited to a character string and may be another expression such as a number.

The restriction information for location further includes partial region information indicating a plurality of partial regions set within a location. For example, "A stadium" in FIG. 3 includes five partial regions of "stands", "field_whole", "field_court center", "field_seats", and "field_stage". The restriction information for location includes partial region information indicating each of these five partial regions. The partial region information is, for example, information in which identification information for each of the five partial regions and a coordinate group indicating the boundary position of the partial region are associated with each other. Further, in another example, the partial region information may be information in which identification information for each of the partial regions is associated with each set of coordinates in a two-dimensional coordinate system representing the inside of the location.

The restriction information for location further includes a virtual angle of view and a proximity distance, as a restriction content for location. Here, the virtual angle of view is a value set beforehand. The proximity distance is an index value indicating how close a virtual viewpoint can be to an object (i.e., a threshold about a distance). The proximity distance is defined by the distance between the virtual viewpoint and the object in the virtual angle of view. The proximity distance is a condition about predetermined image quality such as focusing. In place of the condition, a factor such as a limited zooming factor may be used as the restriction content.

FIGS. 4A, 4B, and 4C are diagrams each illustrating an example of the restriction information for each event type stored in the event DB 122. FIG. 4A is a diagram illustrating an example of restriction information for an event type "basketball". FIG. 4B is a diagram illustrating an example of restriction information for an event type "concert". FIG. 4C is a diagram illustrating an example of restriction information for an event type "volleyball". These pieces of restriction information each include identification information for the event type and a restriction content corresponding to the event type. In the example in FIG. 4A, "basketball" is included as the identification information for the event type. The identification information for the event type is not limited to a character string.

Each piece of the restriction information includes the identification information indicating an event type and the restriction content set for the event type. The restriction content corresponding to the event type is the above-described proximity distance, and the proximity distance is determined for each partial region. For example, as illustrated in FIG. 4A, in a case where a partial region specific to an event type is defined, the restriction information for the event type includes the partial region information indicating the specific partial region. Further, the restriction information for the event type includes information in which the identification information for partial region and the proximity distance serving as the restriction content are associated with each other. In the example in FIG. 4A, a proximity distance "10 m" is associated with a partial region "stands". Further, a proximity distance "n.a." is associated with a partial region "court". Here, "n.a." indicates that there is no restriction. In this way, the restriction content also includes the absence of restriction. The restriction content for the event type is not limited to the proximity distance, and may be any type of content as long as the content is consistent with the restriction content for the location.

Figure 5:
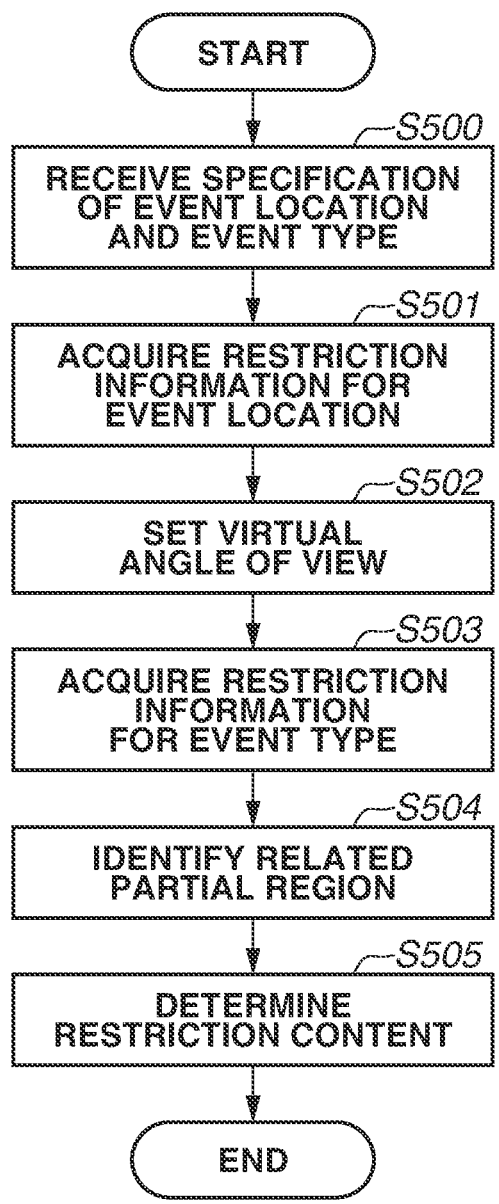
FIG. 5 is a flowchart illustrating restriction determination processing.

FIG. 5 is a flowchart illustrating restriction determination processing by the restriction determination unit 112 of the server apparatus 110. In a case where specification of an event location and an event type is input by the user, the restriction determination unit 112 executes the restriction determination processing. For example, the user causes the display unit 132 of the terminal apparatus 130 to display event locations registered in the location DB 121 and event types registered in the event DB 122. From these displayed options, the user selects an event location and an event type that correspond to a virtual viewpoint image that the user desires to view, via the operation unit 131. In step S500, in response to the selection, the restriction determination unit 112 of the server apparatus 110 receives the specification of the event location and the event type. In other words, in step S500, the restriction determination unit 112 acquires facility information for distinguishing a facility, e.g., a stadium where an event is to be held, and event information about the type of the event. In the present exemplary embodiment, an example of a case is mainly described where restriction processing is executed by using both of the facility information and the event information, but the present exemplary embodiment is not limited to the case. For example, in a case where a facility is uniquely identified beforehand, the restriction processing can be executed by using only the event information. Further, for example, in a case where there is originally only one event as an event to be held, the restriction processing can be executed by using only the facility information. Next, in step S501, the restriction determination unit 112 acquires restriction information for the specified event location, from the location DB 121 of the viewpoint restriction DB 120. Next, in step S502, the restriction determination unit 112 sets a virtual angle of view, by referring to the restriction information for the event location.

Next, in step S503, the restriction determination unit 112 acquires restriction information for the specified event type, from the event DB 122 of the viewpoint restriction DB 120. Next, in step S504, the restriction determination unit 112 identifies a partial region related to the specified event location and the specified event type. The restriction determination unit 112 identifies the related regions by integrating a partial region defined in the restriction information for the event location and a partial region defined in the restriction information about the event type. For example, a partial region such as "stands", which is included in the event location but not included in the event type, is handled as-is as the related region. Regions such as "field" and "outside of court", which each have an overlap between the event location and the event type in terms of arrangement, are handled as the related regions having an intensional relation.

This step will be specifically described with reference to FIG. 3 as well as FIGS. 4A, 4B, and 4C. For example, assume that the event location is "A stadium", and the event type is "basketball" (FIG. 4A). In this case, regions are broadly divided into "stands" and "field". Further, "field" includes "outside of court" and "inside of court". These partial regions are identified as the related regions. Assume that the event location is "A stadium", and the event type is "concert" (FIG. 4B). In this case, regions are broadly divided into "stands", "field_seats", and "field_stage". These partial regions are identified as the related regions. Assume that the event location is "A stadium", and the event type is "volleyball" (FIG. 4C). In this case, regions are broadly divided into "stands" and "field". "field" includes "outside of field" and "inside of field". "inside of court" is either "inside of court_back face" or "inside of court_others" depending on the direction of viewpoint. Therefore, these partial regions are identified as the related regions.

Referring back to FIG. 5, the description will continue. In step S505 following step S504, the restriction determination unit 112 determines a restriction content for each of the related partial regions, based on the restriction information for the event location and the restriction information for the event type. The restriction determination unit 112 determines the restriction content for each of the related partial regions, by integrating the proximity distance serving as the restriction content determined according to the event location, and the proximity distance serving as the restriction content determined according to the event type. For example, assume that the proximity distance "10 m" is defined in the restriction information for the event type. In this case, the restriction determination unit 112 determines the proximity distance "10 m" as the restriction content (the proximity distance) of the related partial region. Further, assume that the proximity distance for the event type is not defined (the proximity distance is "n.a."). In this case, the restriction determination unit 112 determines the proximity distance "2 m" corresponding to the event location, as the restriction content (the proximity distance) of the related partial region. For example, assume that for the partial region "court", the proximity distance "n.a." is defined in the restriction information for the event type. Further, assume that, for the partial region "field" including the partial region "court", the proximity distance "2 m" is defined in the restriction information for the event location. In this case, the restriction content (the proximity distance) of the related partial region is determined to be "2 m".

Figure 6A:
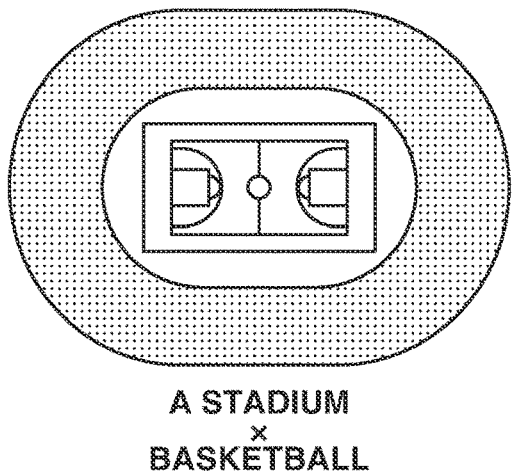
FIGS. 6A, 6B, and 6C are diagrams each illustrating an example of a restriction content determined for a related partial region.
Figure 6B:
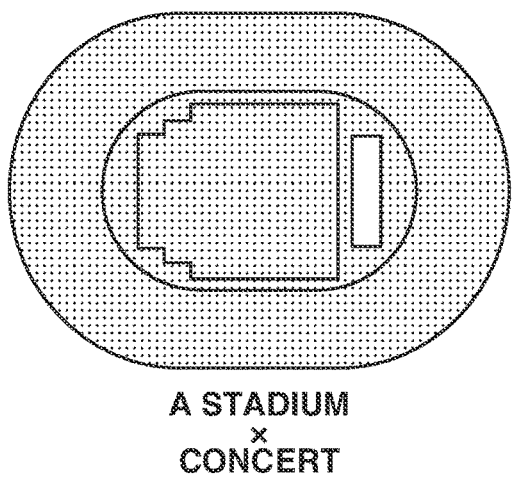
Figure 6C:
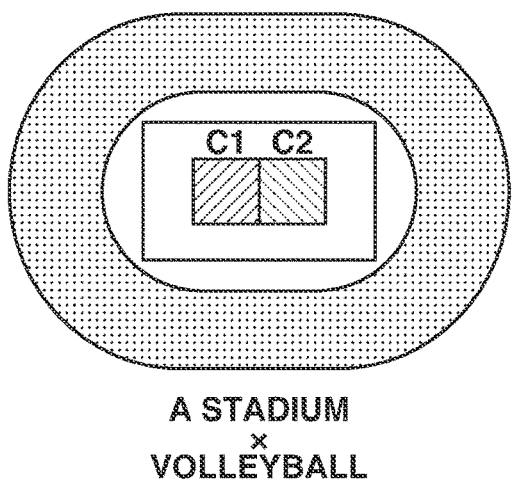

FIGS. 6A, 6B, and 6C are diagrams each illustrating an example of the restriction content determined for the related partial region. FIGS. 6A to 6C correspond to FIGS. 4A to 4C, respectively. In other words, FIG. 6A illustrates the restriction content in the case where the event location is "A stadium" and the event type is "basketball". In FIG. 6A, the proximity distance for the partial region "stands" is 10 m, and a proximity distance in a region other than the region is equal to 2 m that is the proximity distance corresponding to the event location. FIG. 6B illustrates the restriction content in the case where the event location is "A stadium" and the event type is "concert". In this case, the proximity distance for the partial region "seats" is 10 m, and a proximity distance in a region other than the region is 2 m.

FIG. 6C illustrates the restriction content in the case where the event location is "A stadium" and the event type is "volleyball". In this case, the proximity distance for the partial region "stands" is 10 m, the proximity distance for the partial region "inside of court" is 10 m or 2 m, and the proximity distance for a region other than these regions is 2 m. Here, the partial region "inside of court" is "inside of court_back face" if the direction of the virtual viewpoint is a direction approaching the center of the court. Alternatively, the partial region "inside of court" is "inside of court_others" if the direction of the virtual viewpoint is a direction away from the center of the court. Assume that a region C1 in FIG. 6C is on the west side, a region C2 is on the east side, and a direction from north to south is 0 degrees. In this case, a direction toward the region C1 is in a range of 180 to 360 degrees, and a direction toward the region C2 is in a range of 0 to 180 degrees. These two ranges correspond to "inside of court_back face".

Figure 7:
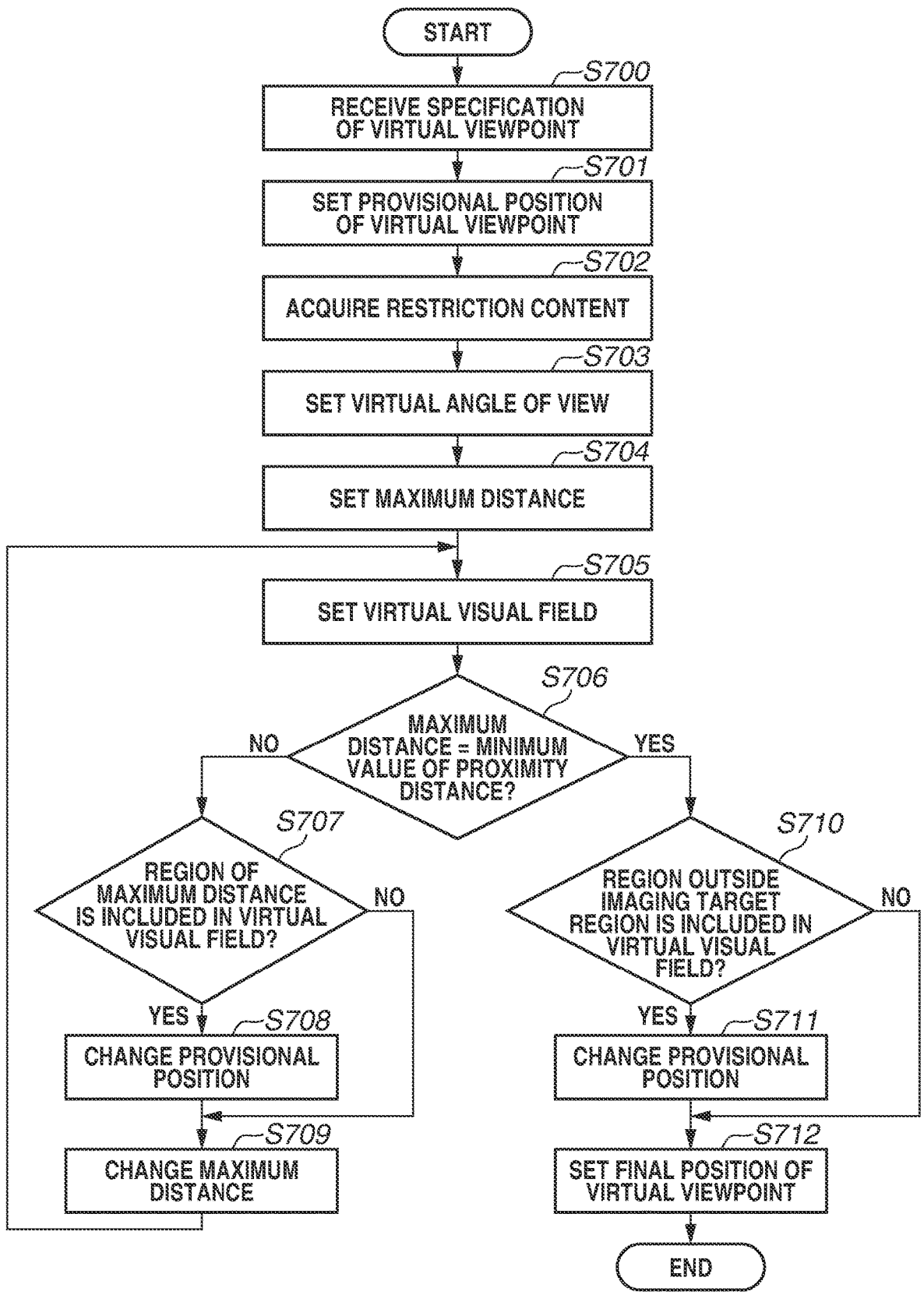
FIG. 7 is a flowchart illustrating virtual viewpoint position determination processing.

FIG. 7 is a flowchart illustrating virtual viewpoint position determination processing by the position determination unit 113 of the server apparatus 110. The position determination unit 113 executes the virtual viewpoint position determination processing, in a case where specification of a virtual viewpoint is input by the user. First, in step S700, the position determination unit 113 of the server apparatus 110 receives specification of a position and/or a direction of a virtual viewpoint. The position of the virtual viewpoint may be information indicating any position within the region of an event location. The position of the virtual viewpoint is expressed, for example, by relative coordinates from a specific starting point such as the center or a corner of the event location, or coordinates such as latitude. The direction of the virtual viewpoint is sufficient if the direction can express a direction of a case where the position of the virtual viewpoint is the starting point. Therefore, the direction is expressed by, for example, an angle of a case where a relative reference line such as the maximum width intersecting the starting point of the event location, or a reference line such as the north-south line, is at 0 degrees.

Next, in step S701, the position determination unit 113 sets the position of the virtual viewpoint according to the specification, as a provisional position of the virtual viewpoint. The position of the virtual viewpoint is to be changed by the present processing. Therefore, the position of the virtual viewpoint according to the specification is set as the provisional position. In the present exemplary embodiment, no change is to be made to the direction. Next, in step S702, the position determination unit 113 acquires the restriction content determined in the restriction determination processing. Next, in step S703, the position determination unit 113 sets a virtual angle of view, according to the restriction content. In the example in FIG. 3, an angle of ±30 degrees is set as the virtual angle of view.

Figure 8:
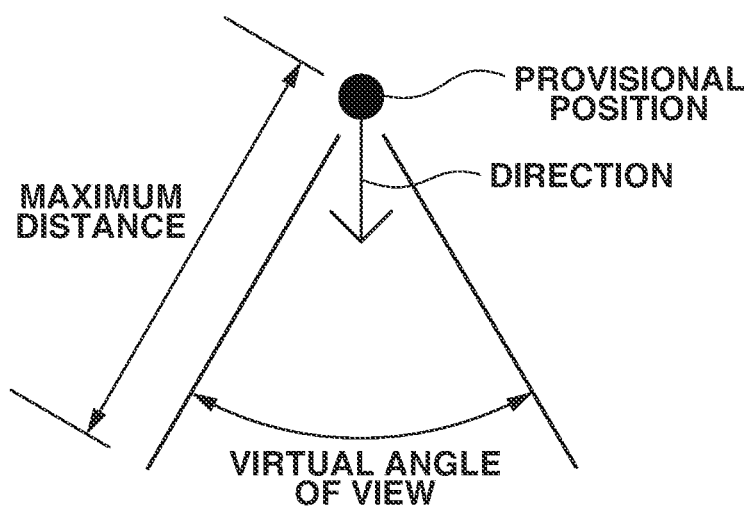
FIG. 8 is a diagram illustrating a virtual visual field.

Next, in step S704, the position determination unit 113 sets, as a maximum distance, a maximum value among proximity distances defined in the acquired restriction content. For example, in the example in FIG. 6A, 10 m is set as the maximum distance because the proximity distance is each of 10 m and 2 m. Next, in step S705, the position determination unit 113 sets a virtual visual field, based on the provisional position of the virtual viewpoint, the direction of the virtual viewpoint, the virtual angle of view, and the maximum distance. As illustrated in FIG. 8, the position determination unit 113 sets a sector-shaped region as the virtual visual field. The sector-shaped region is determined by a central angle in a plus or minus direction determined by the virtual angle of view, assuming that the provisional position is the center, the maximum distance is the radius, and the direction is 0 degrees. In the example in FIG. 6A, the virtual visual field is set to have a radius of 10 m based on the maximum distance of 10 m, and a central angle of 60 degrees based on the virtual angle of view of ±30 degrees. Setting the virtual visual field does not necessarily use the provisional position, the direction, the virtual angle of view, and the maximum distance. Setting the virtual visual field may use, for example, a direction identified from the position of a virtual camera and the position of an object.

Next, in step S706, the position determination unit 113 determines whether the maximum distance in the virtual visual field set in step S705 and a minimum value of the proximity distance in the restriction content acquired in step S702 are equal. If the position determination unit 113 determines that the maximum distance and the minimum value are equal (YES in step S706), the processing proceeds to step S710. If the position determination unit 113 determines that the maximum distance is different from the minimum value, i.e., if the maximum distance is greater than the minimum value (NO in step S706), the processing proceeds to step S707. For example, in the example in FIG. 6A, in a state where 10 m is set as the maximum distance, the maximum distance is greater than the minimum value "2 m" of the proximity distance. In this case, the processing proceeds to step S707.

Next, in step S707, the position determination unit 113 determines whether the region, in which the proximity distance equal to the maximum distance of the virtual visual field is set, is included in the virtual visual field. If the position determination unit 113 determines that the region of the proximity distance equal to the maximum distance is included in the virtual visual field (YES in step S707), the processing proceeds to step S708. If the position determination unit 113 determines that the region of the proximity distance equal to the maximum distance is not included in the virtual visual field (NO in step S707), the processing proceeds to step S709.

Figure 9A:
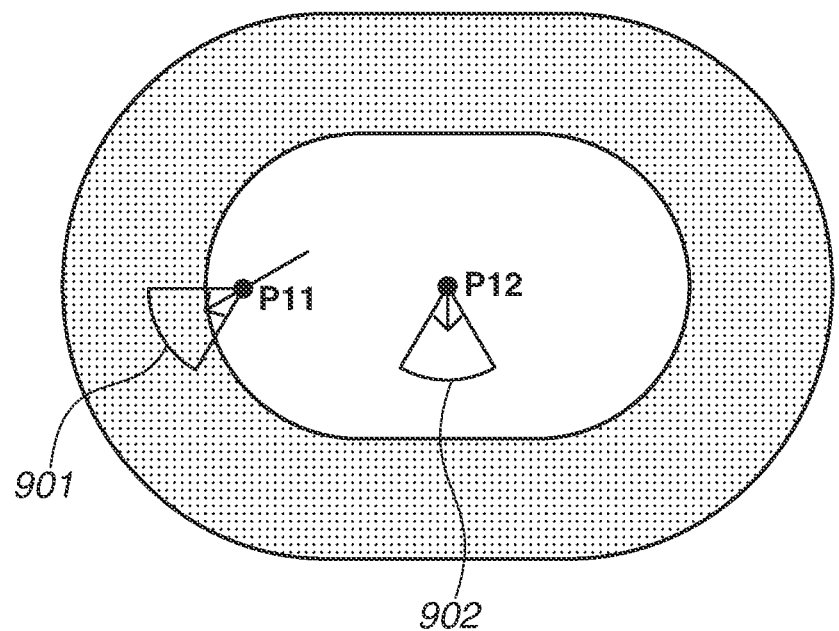
FIGS. 9A and 9B are diagrams illustrating step S707 and step S708.
Figure 9B:
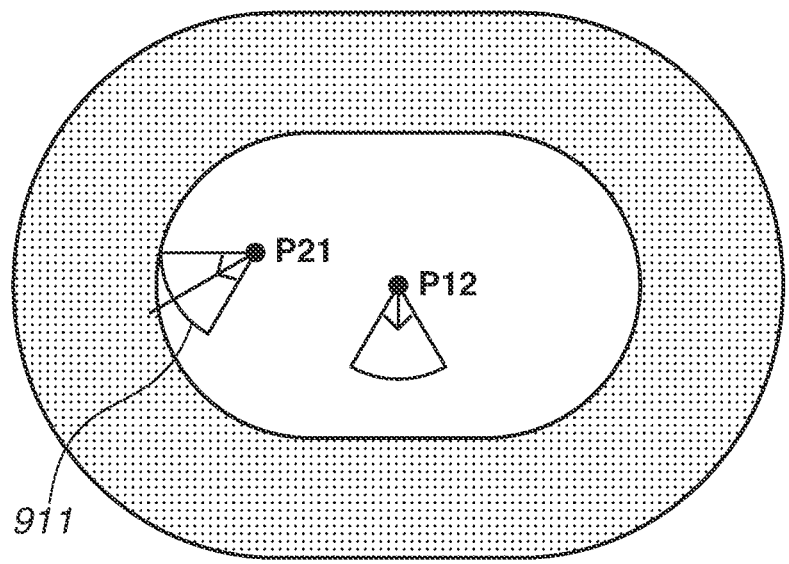

Step S707 will be described with reference to FIGS. 9A and 9B. A case where the restriction content corresponding to FIG. 6A is set will be used as an example. For example, assume that the provisional position is a point P11 in FIG. 9A. Further, assume that the virtual visual field is a region 901. In this case, the virtual visual field (the region) 901 includes a partial region where the proximity distance is 10 m. Therefore, it is necessary to change the provisional position. Meanwhile, assume that the provisional position is a point P12, and the virtual visual field is a region 902. In this case, the virtual visual field (the region) 902 includes only a partial region where the proximity distance is 2 m. Therefore, the partial region of the proximity distance equal to the maximum distance is not included in the virtual visual field.

Referring back to FIG. 7, the description will continue. In step S708, the position determination unit 113 changes the provisional position. Specifically, the position determination unit 113 moves the provisional position in the direction opposite to the direction of the virtual viewpoint, until the partial region in which the maximum distance is set is not included in the virtual visual field. In the example in FIGS. 9A and 9B, the provisional position (the point) P11 in FIG. 9A is changed to a position P21 in FIG. 9B. Therefore, the virtual visual field corresponding to the provisional position (the position) P21 is a region 911, and does not include the partial region where the maximum distance is set. The provisional position (the point) P12 is not changed.

Next, in step S709, the position determination unit 113 changes the maximum distance. Specifically, the position determination unit 113 sets a largest value next to the maximum distance at the time of executing step S709, as a new maximum distance, among proximity distances indicated by the restriction content acquired in step S702. The processing then proceeds to step S705. In a case where the maximum distance of 10 m is set in FIG. 6A, the maximum distance is changed from 10 m to 2 m in step S709. Afterward, in step S705, an area having a radius of 2 m and a central angle of 60 degrees is set as the virtual visual field. Then, step S706 and subsequent steps are performed.

In step S710, the position determination unit 113 determines whether a region outside the imaging target region is included in the virtual visual field. If the position determination unit 113 determines that the region outside the imaging target region is included in the virtual visual field (YES in step S710), the processing proceeds to step S711. If the position determination unit 113 determines that the region outside the imaging target region is not included in the virtual visual field (NO in step S710), the processing proceeds to step S712. In step S711, the position determination unit 113 changes the provisional position. Specifically, the position determination unit 113 moves the provisional position in the direction opposite to the direction of the virtual viewpoint until the region outside the imaging target region is not included in the virtual visual field. Next, in step S712, the position determination unit 113 sets the position changed in step S711, as the final position of the virtual viewpoint. The position determination unit 113 may be configured to determine at least only one of the position and the direction of the virtual viewpoint.

Figure 10A:
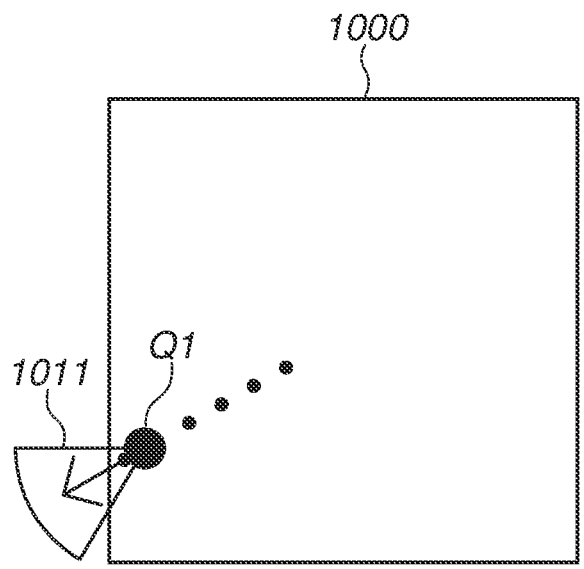
FIGS. 10A and 10B are diagrams illustrating step S711.
Figure 10B:
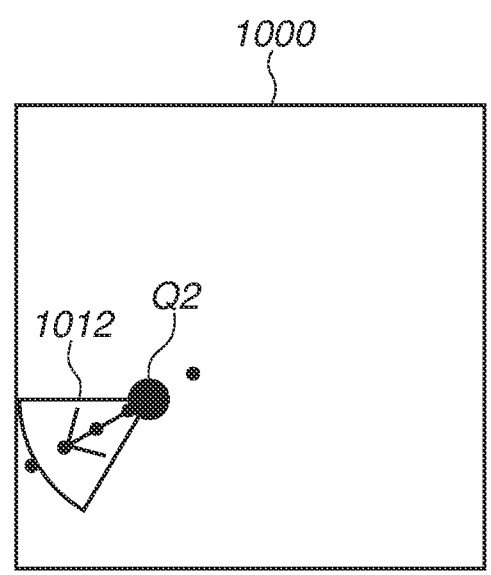

Step S711 will be described with reference to FIGS. 10A and 10B. For example, assume that the provisional position is a point Q1 in FIG. 10A, the virtual visual field is a region 1011, and the virtual visual field (the region) 1011 includes a region outside an imaging target region 1000. In this case, the position determination unit 113 changes the provisional position from the point Q1 to a point Q2, as illustrated in FIG. 10B. As a result, the virtual visual field corresponding to the point Q2 serving as the provisional position is a region 1012, and the region outside the imaging target region 1000 is not included in the virtual visual field.

In the restriction determination processing, the server apparatus 110 determines the restriction content corresponding to the event location and the event type specified by the user. Then, in the virtual viewpoint position determination processing, the server apparatus 110 appropriately changes the position of the virtual viewpoint specified by the user, according to the restriction content determined in the restriction determination processing. Afterward, the video image generation unit 114 of the server apparatus 110 generates a virtual viewpoint image from a video image stored in the video image DB 111, based on the changed position and the direction of the virtual viewpoint. The present processing is an example of processing for generating a virtual viewpoint image from a multiple-viewpoint image. The virtual viewpoint image generated by the video image generation unit 114 is transmitted to the terminal apparatus 130. The virtual viewpoint image is then reproduced and displayed by the display unit 132.

As described above, in the first exemplary embodiment, the server apparatus 110 changes the position of the virtual viewpoint, based on the restriction information corresponding to the event location and the restriction information corresponding to the event type. Therefore, in providing an image of an imaging target region where two or more types of events can be held, providing the image can be appropriately restricted according to the type of event. In addition, because the restriction content can be determined by the combination of the event location and the event type, it is not necessary to set the restriction information for every combination of an event location and an event type.

According to a first modification of the first exemplary embodiment, in a case where there is only one imaging target region corresponding to the virtual viewpoint image, the location DB 121 of the viewpoint restriction DB 120 may store only one piece of restriction information corresponding to the location. In this case, it is not necessary to receive the specification of the event location from the user and select the restriction information according to the event location.

According to a second modification, in a case where the restriction content corresponding to the event location is unnecessary, the server apparatus 110 may change the position of the virtual viewpoint, based on the restriction content corresponding to the event type, without considering the restriction content corresponding to the event location.

According to a third modification, the subject to be changed according to the restriction content is not limited to the position of the virtual viewpoint. For example, the server apparatus 110 may perform control to exclude the virtual visual field from a partial region not satisfying the proximity distance, by changing the direction of the virtual viewpoint. In this way, the server apparatus 110 may change at least one of the position and the direction of the virtual viewpoint. In another example, the virtual angle of view can be changed, and the server apparatus 110 may perform control to exclude the virtual visual field from the partial region not satisfying the proximity distance, by changing the virtual angle of view.

According to a fourth modification, instead of changing the position or the direction of the virtual viewpoint, the server apparatus 110 may perform image processing, such as conversion into an image hard to visually recognize, on the virtual viewpoint image, for the partial region not satisfying the proximity distance. Examples of such image processing include mosaic processing.

According to a fifth modification, instead of changing the position of the virtual viewpoint specified by the user, the server apparatus 110 may perform restriction such as prohibition or invalidation of a user input, for the position of a virtual viewpoint that satisfies the condition of the determined restriction content.

In a system according to a second exemplary embodiment, a restriction content varying for each time period is defined as the restriction content for the event type. The system according to the second exemplary embodiment will be described below, in terms of different points from the system according to the first exemplary embodiment.

Figure 11:
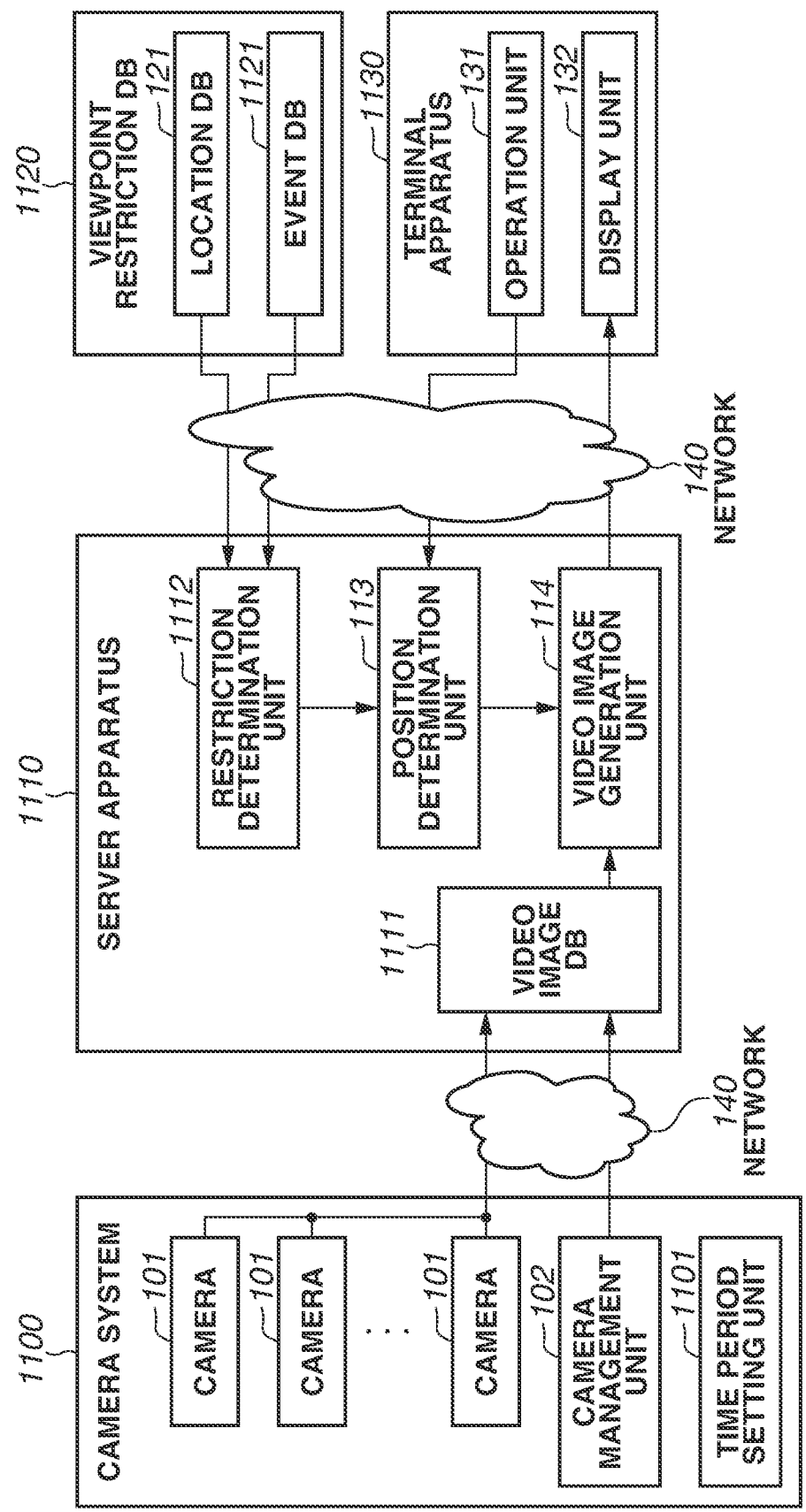
FIG. 11 is an overall diagram of a system according to a second exemplary embodiment.

FIG. 11 is an overall diagram of a system according to the second exemplary embodiment. In the second exemplary embodiment, a camera system 1100 has a time period setting unit 1101, in addition to cameras 101 and a camera management unit 102. The time period setting unit 1101 transmits information for identifying a time period such as "before game" or "halftime" set by a user such as an operator, to a server apparatus 1110 via a network 140. In the server apparatus 1110, a video image DB 1111 stores the identification information for a time period, together with multiple-viewpoint video data and camera parameters. A restriction determination unit 1112 is similar to the restriction determination unit 112 of the first exemplary embodiment. However, the restriction determination unit 1112 also considers a time period specified by the user, when determining the restriction content. In a viewpoint restriction DB 1120, an event DB 1121 stores pieces of restriction information for the event type. In the second exemplary embodiment, the restriction content for each time period is defined in the restriction information for the event type.

Figure 12A:
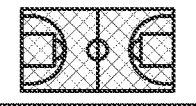
FIGS. 12A and 12B are diagrams illustrating an example of restriction information for the event type.
Figure 12B:
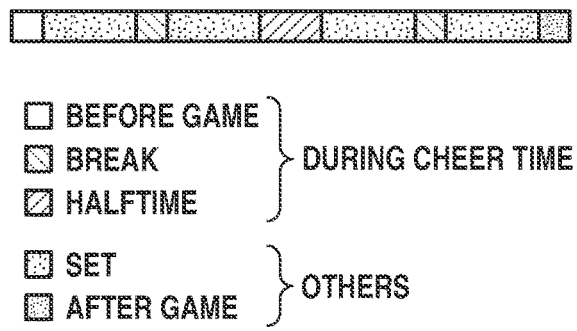

FIGS. 12A and 12B are diagrams illustrating an example of the restriction information for the event type. FIG. 12A illustrates "during cheer time" and "others" each as the identification information for a time period. In the present exemplary embodiment, "during cheer time" and "others" are each associated with the identification information for a time period set by the time period setting unit 1101, as illustrated in FIG. 12B. In the present exemplary embodiment, assume that nine types of time period are set by the time period setting unit 1101. The nine types are "before game", "set 1", "break 1", "set 2", "halftime", "set 3", "break 2", "set 4", and "after game". Of these types, "before game", "break", and "halftime" correspond to "during cheer time", and the remaining types correspond to "others". The identification information for a time period is not limited to a character string. As illustrated in FIG. 12A, proximity distances varying between time periods are associated with the same partial region of "inside of court", in the restriction information for the event type.

FIG. 13 is a flowchart illustrating restriction determination processing by the restriction determination unit 1112 of the server apparatus 1110 in the second exemplary embodiment. Among steps in the restriction determination processing illustrated in FIG. 13, the step that is the same as the step of the restriction determination processing according to the first exemplary embodiment described with reference to FIG. 5 will be provided with the reference numeral that is the same as that of the restriction determination processing in FIG. 5. In step S1300, the restriction determination unit 1112 receives specification of an event location, an event type, and a time period. The processing then proceeds to step S501. After step S501 to step S503, the processing proceeds to step S1301. In step S1301, the restriction determination unit 1112 identifies a partial region related to the event location, the event type, and the time period according to the specification. The identification of the related region is similar to step S504. However, in step S1301, the restriction determination unit 1112 refers to only a restriction content corresponding to the time period according to the specification, among the restriction information for the event type. After step S1301, the processing proceeds to step S505.

Figure 14A:
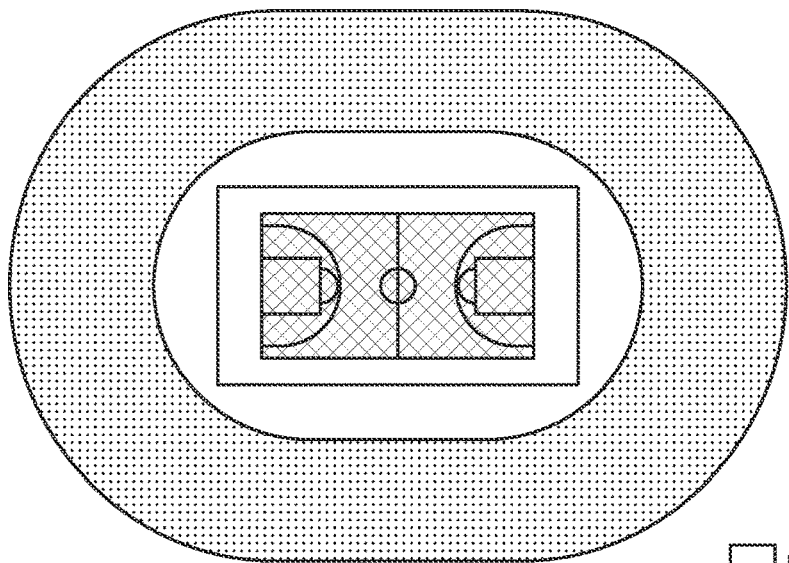
FIGS. 14A and 14B are diagrams illustrating step S1301 and step S505.
Figure 14B:
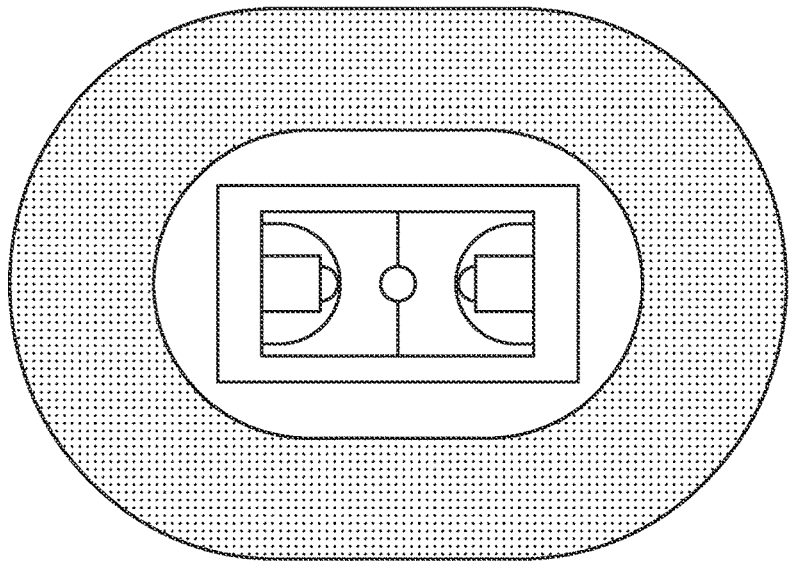

Here, step S1301 and step S505 will be specifically described with reference to FIGS. 12A and 12B as well as FIGS. 14A and 14B. For example, assume that the time period is "halftime". In this case, because "halftime" corresponds to "during cheer time", the restriction determination unit 1112 uses "5 m" associated with "during cheer time", as the proximity distance for the partial region "inside of court", in the restriction information for the event type, as illustrated in FIGS. 12A and 12B. Therefore, in this case, the proximity distance of the partial region "stands" is "10 m", the proximity distance of "inside of court" is "5 m", and the proximity distance of the other regions is "2 m", as illustrated in FIG. 14A.

Further, assume that the time period is "set 2". In this case, because "set 2" corresponds to "others", the restriction determination unit 1112 uses "n.a." associated with "others", as the proximity distance for the partial region "inside of court", in the restriction information for the event type, as illustrated in FIGS. 12A and 12B. Therefore, in this case, the proximity distance for the partial region "stands" is "10 m", and the proximity distance of other regions is "2 m" as illustrated in FIG. 14B.

The other configurations and processing of the system according to the second exemplary embodiment are similar to those of the first exemplary embodiment. In this way, in the second exemplary embodiment, it is possible to determine an appropriate restriction content corresponding to the time period.

According to a modification of the second exemplary embodiment, receiving the specification of the time period in step S1300 is not limited to the present exemplary embodiment. In another example, in a case where a virtual viewpoint image is generated from a captured video image in real time, the restriction determination unit 1112 may determine a restriction content, by using a time period including the time when an event location and an event type are specified by the user, as a processing target.

In a system according to a third exemplary embodiment, a restriction content is varied according to a user attribute (user classification) of a user who views a virtual viewpoint image. The system according to the third exemplary embodiment will be described below, in terms of different points from the system according to each of the first and second exemplary embodiments. FIG. 15 is an overall diagram of the system according to the third exemplary embodiment. In the third exemplary embodiment, a viewpoint restriction DB 1510 has a user DB 1511, in addition to a location DB 121 and an event DB 122. In a server apparatus 1500, a restriction determination unit 1501 refers to the user DB 1511 when determining a restriction content.

FIG. 16 is a diagram illustrating an example of the user DB 1511. The user DB 1511 stores a user classification and a restriction condition associated with each other. Here, the user classification is information indicating an attribute (a user attribute) of a user who desires to view a virtual viewpoint image. A change content is information indicating a change content based on a restriction content determined according to an event location and an event type specified by the user, with reference to the location DB 121 and the event DB 122.

In the example in FIG. 16, a user classification of "guard" is associated with a change content of "restriction_none". This means that in a case where the viewing user is a guard, a virtual viewpoint image with no restriction is generated and provided regardless of a restriction content determined according to the event location and the event type specified by the user. Even if the change content is "restriction_none", restriction of a proximity distance (e.g., 2 m in the example illustrated in FIG. 3) associated with the event location is maintained.

Further, a user classification of "spectator_inside of venue" is associated with a change content of "restriction_normal". This means that in a case where the viewing user is a spectator inside the venue, a virtual viewpoint image is generated and provided under restriction using the restriction content determined according to the event location and the event type, i.e., a normal restriction content. Further, a user classification of "spectator outside of venue" is associated with a change content of "restriction_5 m+". This means that in a case where the viewing user is a spectator outside the venue, the restriction content determined according to the event location and the event type is changed to increase the proximity distance by 5 m, and a virtual viewpoint image is generated and provided under the restriction.

Figure 17:
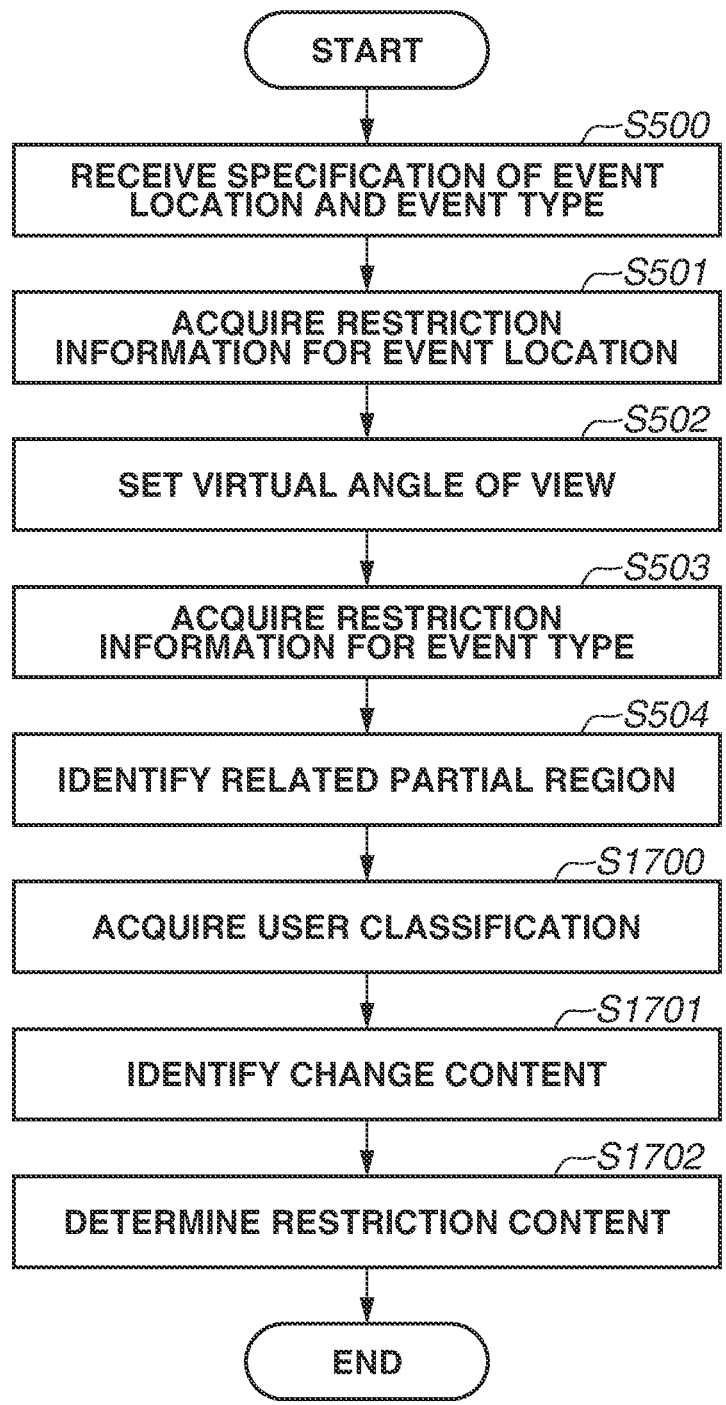
FIG. 17 is a flowchart illustrating restriction determination processing according to the third exemplary embodiment.

FIG. 17 is a flowchart illustrating restriction determination processing by the restriction determination unit 1501 of the server apparatus 1500 according to the third exemplary embodiment. Among steps in the restriction determination processing illustrated in FIG. 17, the step that is the same as the step of the restriction determination processing according to the first exemplary embodiment described with reference to FIG. 5 will be provided with the reference numeral that is the same as that of the restriction determination processing in FIG. 5. After step S504, the processing proceeds to step S1700. In step S1700, the restriction determination unit 1501 of the server apparatus 1500 acquires a user classification from the terminal apparatus 130 according to information such as a user input in the terminal apparatus 130. Next, in step S1701, the restriction determination unit 1501 refers to the user DB 1511, thereby identifying a change content associated with the user classification acquired in step S1700. Next, in step S1702, the restriction determination unit 1501 determines a restriction content for each of related partial regions, based on restriction information for event location and restriction information for the event type. In this step, the restriction determination unit 1501 determines a restriction content reflecting the change content.

For example, assume that the event location is "A stadium" and the event type is "basketball" (see FIG. 3 and FIG. 4A). In this case, the proximity distance of the partial region of "stands" is 2 m in a case where the user classification is "guard". The proximity distance is 10 m in a case where the user classification is "spectator_inside of venue", and the proximity distance is m in a case where the user classification is "spectator_outside of venue".

The other configurations and processing of the system according to the third exemplary embodiment are similar to those of each of the first and second exemplary embodiments. As described above, in the third exemplary embodiment, it is possible to determine an appropriate restriction content corresponding to the user classification.

In a system according to a fourth exemplary embodiment, instead of a virtual viewpoint image, a video image captured from a viewpoint corresponding to a restriction content is generated and provided. The system according to the fourth exemplary embodiment will be described below, in terms of different points from the system according to each of the other exemplary embodiments. FIG. 18 is an overall diagram of the system according to the fourth exemplary embodiment. In the fourth exemplary embodiment, a server apparatus 1800 has a video image selection unit 1801 in place of the video image generation unit 114. The video image selection unit 1801 selects a video image to be provided to the terminal apparatus 130 from among video images stored in the video image DB 111, based on a position and a direction of a virtual viewpoint determined by a position determination unit 113. The video image selection unit 1801 then transmits the selected video image to the terminal apparatus 130.

Figure 19A:
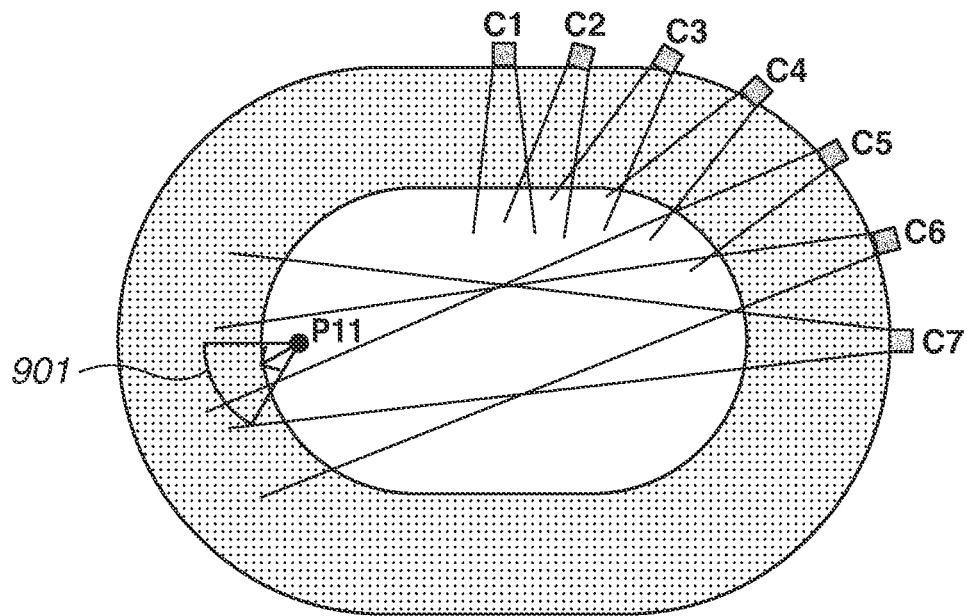
FIGS. 19A and 19B are diagrams illustrating processing of a video image selection unit.
Figure 19B:
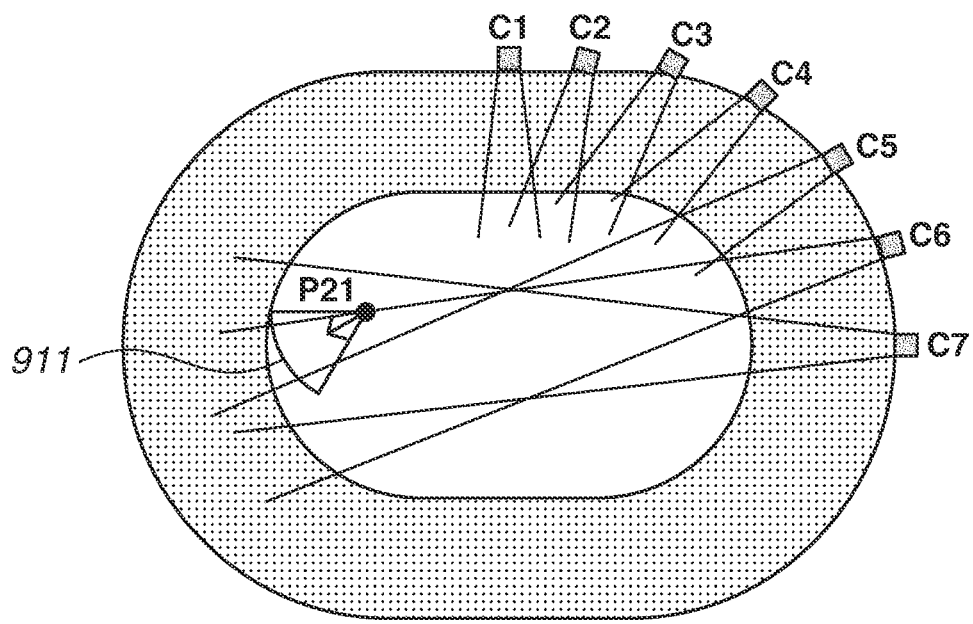

FIGS. 19A and 19B are diagrams illustrating processing of the video image selection unit 1801. FIGS. 19A and 19B correspond to FIGS. 9A and 9B, respectively. Assume that a provisional position is a point P11 and a virtual visual field in this case is a region 901, as illustrated in FIG. 19A. The provisional position is changed from the point P11 to a point P21 in FIG. 19B, and the virtual visual field thereby changes to a region 911.

In this case, a camera C6 is selected as a camera including the broadest virtual visual field (the region) 901 of the point P11 serving as the provisional position. However, a camera C7 is selected as a camera including the broadest virtual visual field (the region 911) of the point P21 that is the position after the change. In this case, the video image selection unit 1801 selects a video image of the camera C7 determined according to the position after the change, from the video image DB 111. The video image selection unit 1801 then transmits the selected video image to the terminal apparatus 130. In a case where the selected camera is capable of zooming, a zooming factor for approaching the virtual visual field can be set, and a video image captured using the zooming factor can be transmitted to the terminal apparatus 130.

The other configurations and processing of the system according to the fourth exemplary embodiment are similar to those of each of the other exemplary embodiments. As described above, in the fourth exemplary embodiment, it is possible to provide an appropriate image corresponding to the restriction content.

The present disclosure has been described above in detail with reference to desirable exemplary embodiments. However, the present disclosure is not limited to these specific exemplary embodiments, and includes various forms within the scope not deviating from the gist of the present disclosure. The above-described exemplary embodiments may be partially combined as appropriate.

According to the system of each of the exemplary embodiments, generation of a virtual viewpoint image according to an imaging target region can be restricted according to an event.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2017-131454, filed Jul. 4, 2017, which is hereby incorporated by reference herein in its entirety.

What is claimed is:

1. An information processing apparatus comprising:
one or more hardware processors; and
one or more memories storing one or more programs configured to be executed by the one or more hardware processors, the one or more programs including instructions for:
receiving a user operation to specify a position and a direction of a virtual viewpoint used for generating a virtual viewpoint image based on a plurality of images obtained by a plurality of image capturing apparatuses that capture images of an imaging target region from different directions;
determining a condition of a virtual viewpoint from a plurality of conditions for restricting provision of a virtual viewpoint image corresponding to the virtual viewpoint based on a type of event which has been held in the imaging target region; and
performing control such that a virtual viewpoint image corresponding to a position and a direction of a virtual viewpoint according to the user operation is not provided in a case where at least one of the position and the direction of the virtual viewpoint meets the condition.

2. The information processing apparatus according to claim 1, wherein the performing performs control such that a virtual viewpoint image corresponding to a position and a direction of a virtual viewpoint according to the user operation is not provided by changing at least one of the position and the direction of the virtual viewpoint in the case where at least one of the position and the direction of the virtual viewpoint meets the condition.

3. The information processing apparatus according to claim 2, wherein the one or more programs includes instructions for generating a virtual viewpoint image corresponding to a position and a direction of the changed virtual viewpoint.

4. The information processing apparatus according to claim 2,
wherein the determining determines a condition of a virtual viewpoint from a plurality of conditions further based on facility information about an imaging target facility, and
the performing performs control such that a virtual viewpoint image corresponding to a position and a direction of a virtual viewpoint according to the user operation is not provided in the case where at least one of the position and the direction of the virtual viewpoint meets the condition.

5. The information processing apparatus according to claim 1,
wherein the condition indicates that a generation of a virtual viewpoint image corresponding to a position and a direction of a virtual viewpoint is restricted depending on a distance between the position of the virtual viewpoint and an object region in the virtual viewpoint image corresponding to the virtual viewpoint, and
the performing performs control such that a virtual viewpoint image corresponding to a position and a direction of a virtual viewpoint according to the user operation is not provided in a case where the position of the virtual viewpoint meets the condition.

6. The information processing apparatus according to claim 5,
wherein the condition indicates that a provision a virtual viewpoint image corresponding to a position and a direction of a virtual viewpoint is restricted in a case where the distance is shorter than a predetermined threshold, and
the performing performs control such that a virtual viewpoint image corresponding to the position and the direction of the virtual viewpoint according to the user operation is not provided in a case where a distance between the position of the virtual viewpoint and the object region in the virtual viewpoint image corresponding to the virtual viewpoint is shorter than the predetermined threshold.

7. The information processing apparatus according to claim 6, wherein the threshold about the distance varies between a first partial region and a second partial region included in the imaging target region.

8. The information processing apparatus according to claim 1, wherein the determining determines a condition of a virtual viewpoint from a plurality of conditions further based on time information about a virtual viewpoint image, and the performing performs control such that a virtual viewpoint image corresponding to a position and a direction of a virtual viewpoint according to the user operation is not provided in the case where at least one of the position and the direction of the virtual viewpoint meets the condition.

9. The information processing apparatus according to claim 1, wherein the determining determines a condition of a virtual viewpoint from a plurality of conditions further based on a user attribute that requests generation of a virtual viewpoint image, and the performing performs control such that a virtual viewpoint image corresponding to a position and a direction of a virtual viewpoint according to the user operation is not provided in the case where at least one of the position and the direction of the virtual viewpoint meets the condition.

10. A restriction method comprising:

receiving a user operation to specify a position and a direction of a virtual viewpoint used for generating a virtual viewpoint image based on a plurality of images obtained by a plurality of image capturing apparatuses that capture images of an imaging target region from different directions;

determining a condition of a virtual viewpoint from a plurality of conditions for restricting provision of a virtual viewpoint image corresponding to the virtual viewpoint based on a type of event which has been held in the imaging target region; and performing control such that a virtual viewpoint image corresponding to a position and a direction of a virtual viewpoint according to the user operation is not provided in a case where at least one of the position and the direction of the virtual viewpoint meets the condition.

11. A non-transitory computer-readable storage medium storing a program for causing a computer to execute a restriction method, the method comprising:

receiving a user operation to specify a position and a direction of a virtual viewpoint used for generating a virtual viewpoint image based on a plurality of images obtained by a plurality of image capturing apparatuses that capture images of an imaging target region from different directions;

determining a condition of a virtual viewpoint from a plurality of conditions for restricting provision of a virtual viewpoint image corresponding to the virtual viewpoint based on a type of event which has been held in the imaging target region; and performing control such that a virtual viewpoint image corresponding to a position and a direction of a virtual viewpoint according to the user operation is not provided in a case where at least one of the position and the direction of the virtual viewpoint meets the condition.

12. The information processing apparatus according to claim 1, wherein the performing performs control such that a virtual viewpoint image corresponding to a position and a direction of a virtual viewpoint according to the user operation is not provided by performing image processing to convert an image into an image hard to visually recognize on the virtual viewpoint image in the case where at least one of the position and the direction of the virtual viewpoint meets the condition.

13. The information processing apparatus according to claim 1, wherein the performing performs control such that a virtual viewpoint image corresponding to a position and a direction of a virtual viewpoint according to the user operation is not provided by controlling the position of the virtual viewpoint not to be used for generating the virtual viewpoint image in a case where the position of the virtual viewpoint meets the condition.

14. The information processing apparatus according to claim 1, wherein the performing performs control such that a virtual viewpoint image corresponding to a position and a direction of a virtual viewpoint according to the user operation is not provided by controlling the direction of the virtual viewpoint not to be used for generating the virtual viewpoint image in a case where the direction of the virtual viewpoint meets the condition.

* * * * *